Figure 1:
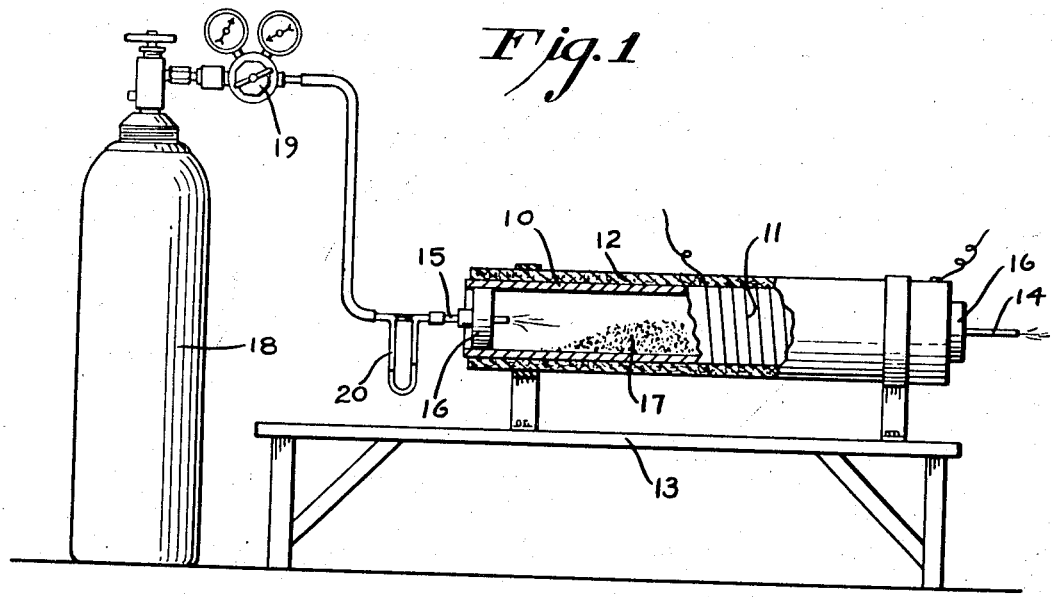

Dec. 27, 1938.  M. E. NORDBERG  2,141,444

METHOD OF PURIFYING ALUMINOUS MATERIALS

Filed March 16, 1937

INVENTOR.
MARTIN E. NORDBERG
BY Dorsey + Cole
ATTORNEYS.

UNITED STATES PATENT OFFICE 2,141,444

METHOD OF PURIFYING ALUMINOUS MATERIALS

Martin E. Nordberg, Corning, N. Y., assignor to Corning Glass Works, Corning, N. Y., a corporation of New York Application March 16, 1937, Serial No. 131,265

1 Claim. (Cl. 23—142)

This invention relates to methods of purifying ceramic materials, and more particularly high alumina materials such as kaolin, kyanite, bauxite, diaspore and the like.

An important object of the invention is to remove iron and iron bearing impurities from the materials and thus provide a cheap source of pure alumina for use in making glass, enamels, porcelain and other ceramic products.

Another object is to whiten clays and other aluminous materials so that they will be more suitable for use as fillers for paper, textiles, etc.

A further object is to prevent any substantial loss of alumina during the treatment for removal of iron.

This invention consists in converting the iron impurity to chloride form at elevated temperatures and volatilizing the iron chloride and separating it from the material under conditions which will permit the use of a minimum quantity of chlorine or its compounds to remove the maximum amount of iron but at the same time to cause substantially no loss of alumina.

Since the iron impurity in clay is present largely as iron oxide, the total iron content will be considered for convenience as if it were ferric oxide and it is to be understood that other compounds of iron which may be present will also react and be converted to chloride during the process to be described.

Ferric oxide at elevated temperatures reacts with chlorine to form ferric chloride in accordance with the following equation:

$$2Fe_2O_3 + 6Cl_2 = 4FeCl_3 + 3O_2 \quad (1)$$

The reaction is reversible. At equilibrium below 1100° C. the ratio of the partial pressure of chlorine to the partial pressure of ferric chloride is high and hence it is necessary to use a large excess of chlorine. Such a procedure requires too great an expenditure of chlorine to be economically feasible and even though means were to be employed to recover the uncombined chlorine the attendant expense would increase the cost of the purified material unduly. With high aluminous materials containing less than 5% $Fe_2O_3$, it has been found that practically six times as much chlorine is required as would be expected from equilibrium data for the above reaction with pure ferric oxide. This indicates that in the case of clay the ferric oxide is in a state of solid solution with the alumina, wherefore the activity of the iron oxide will depend upon its concentration and relatively more chlorine will be required for dilute solutions.

The use of a large excess of chlorine may be avoided by reducing the partial pressure of the oxygen resulting from Equation 1 to a minimum. Since the partial pressure of the oxygen liberated is very low, a powerful reducing agent is required. Such reduction in pressure can be accomplished by carrying out the chlorination in the presence of intimately admixed carbon which will combine with the oxygen in accordance with the following equation:

$$O + 2C = 2CO \quad (2)$$

The combined Equations 1 and 2 then become $$Fe_2O_3 + 3C + 3Cl_2 = 2FeCl_3 + 3CO \quad (3)$$

Ordinarily, in this case the loss of alumina is very pronounced because the formation of aluminum chloride is in like manner also facilitated by the presence of carbon.

$$Al_2O_3 + 3C + Cl_2 = 2AlCl_3 + 3CO \quad (4)$$

I have discovered, however, that at temperatures of 900° C. to 1150° C., when the amount of carbon is kept low and the chlorine is passed through or over the material at a very slow rate, substantially all of the iron is converted to ferric chloride and is volatilized out of the material without appreciable loss of alumina. For example, I have removed about 83% of the iron from a calcined clay, which initially contained about .4% ferric oxide and to which 1% of lamp black had been added, by passing 3 cc. of chlorine per minute per 10 grams of clay through the material at a temperature of 1075 C. for 30 minutes. The above quantity of chlorine is less than one-seventh the amount that would be required if no carbon were present. I have also found that a temperature above 900° C. is necessary to effect a satisfactory separation of iron from aluminous materials, as is clearly indicated by the following table which shows the results obtained at various temperatures and with various rates of flow of chlorine for 10 gram samples of a calcined kaolin containing .42% $Fe_2O_3$ to which 1% of lamp black was added and thoroughly mixed therewith. This amount of carbon is substantially ten times the amount that would theoretically be required and represents the maximum proportion of carbon which I have found it desirable to use.

| Temp. in °C. | Time in minutes | Chlorine 21° C. 750 mm.; cc. per min. | Loss in weight in percent | Residual $Fe_2O_3$ in percent | Ratio of $Al_2O_3$ lost to $Fe_2O_3$ removed | Ratio of weight Cl used to $Fe_2O_3$ removed |
|---|---|---|---|---|---|---|
| 610 | 60 | 22 | 3.3 | 0.39 | 73 | 480 |
| 700 | 60 | 22 | 5.6 | .33 | 48 | 175 |
| 900 | 60 | 22 | 6.9 | .094 | 21 | 58 |
| 1075 | 30 | 22 | 6.2 | .062 | 17 | 26 |
| 1075 | 30 | 22 | 5.0 | .059 | 14 | 26 |
| 1075 | 30 | 9 | 5.0 | .050 | 13 | 10.6 |
| 1075 | 30 | 3 | 3.0 | .070 | 8 | 3.7 |

From the above data it will be noted that at temperatures below 900° C. very little iron is removed, although the amount of chlorine used in proportion to the iron removed is very high and the loss of alumina as compared to loss of iron is relatively great. On the other hand, at temperatures of 900° C. and above the iron content is materially and satisfactorily decreased with a relatively small expenditure of chlorine and the loss of alumina as compared to the loss of iron is correspondingly low. The effect of low rates of flow is particularly noticeable in regard to expenditure of chlorine and loss of alumina with respect to iron removed.

The apparatus required is very simple and may consist of any suitable receptacle, which is capable of being heated and of being closed to exclude air, which will not be attacked by chlorine and into which the material to be treated together with the chlorine may be introduced as will later be described.

It is believed that the efficiency of my process may be explained at least in part as follows: Some of the alumina and iron are converted to chlorides in accordance with the reactions shown in Equations (4) and (5), the amount of aluminum chloride formed being in very great excess on account of the high concentration of alumina and the fact that most of the iron is enclosed within the grains. With too rapid a flow of chlorine the aluminum chloride would be swept out of the zone of reaction and the available carbon would thus be used up with consequent loss of alumina and only a small removal of iron for the amount of chlorine used. However, by passing the chlorine at a sufficiently slow rate, the aluminum chloride is not quickly swept out but remains in the reaction zone. The aluminum chloride diffuses into the grains and since aluminum oxide is more stable than iron oxide or has a higher heat of formation, it reacts with the unconverted iron oxide in the material as follows:

$$2AlCl_3 + Fe_2O_3 = Al_2O_3 + 2FeCl_3 \quad (5)$$

The diffusion may be facilitated by a change in the physical structure of the grains which is due to a recrystallization that occurs above 870° C. If the amount of carbon present is calculated, from the known amount of iron present, to be slightly in excess of that necessary to satisfy the requirement of Equation (4), substantially all of the ferric oxide will be converted to ferric chloride by the aluminum chloride according to Equation (5) and volatilized and since the amount of carbon was small there will be substantially no loss of alumina.

Instead of introducing the chlorine continuously at a slow rate the total equivalent amount thereof may be introduced and withdrawn intermittently, under pressure if necessary, the requisite being that it should be kept in contact with the material for the time required to obtain the same result and such a modification of the process is within the scope of this invention.

Another embodiment of my invention consists in using in lieu of the chlorine gas of Equation (1) the vapor of a chloride of an element whose oxide is more stable than ferric oxide, such as silicon tetrachloride, aluminum chloride and titanium tetrachloride. The reaction which occurs with aluminum chloride is indicated above in Equation (5). The other reactions are:

$$3SiCl_4 + 2Fe_2O_3 = 3SiO_2 + 4FeCl_3 \quad (6)$$
$$3TiCl_4 + 2Fe_2O_3 = 3TiO_2 + 4FeCl_3 \quad (7)$$

In carrying out the process according to the reactions set forth in Equations 5, 6 and 7, the aluminous material is heated to a temperature of 900°–1150° C. and the vapor of the chloride is passed through and over the material while air is excluded from the apparatus. It is important that oxidizing agents or free oxygen, such as air, be absent because this would cause oxidation of the chlorinating agents and reoxidation of the ferric chloride in a manner analogous to the reversal of Equation 1, a condition which is here sought to be avoided. The amount of chloride vapor used and the rate at which it is introduced is governed only by economic considerations. In other words, the chloride vapor should be introduced at such a rate and for such a time as will insure maximum reaction with the ferric oxide without undue waste of the chlorinating agent. The proper rate and time may readily be determined by trial.

In order that my invention may more readily be understood, reference is had to the accompanying drawing which illustrates the simplest form of apparatus adaptable for carrying out my invention, it being understood that the process as claimed may be carried out in various types of apparatus without departing from the spirit and scope of the invention.

Figure 2:
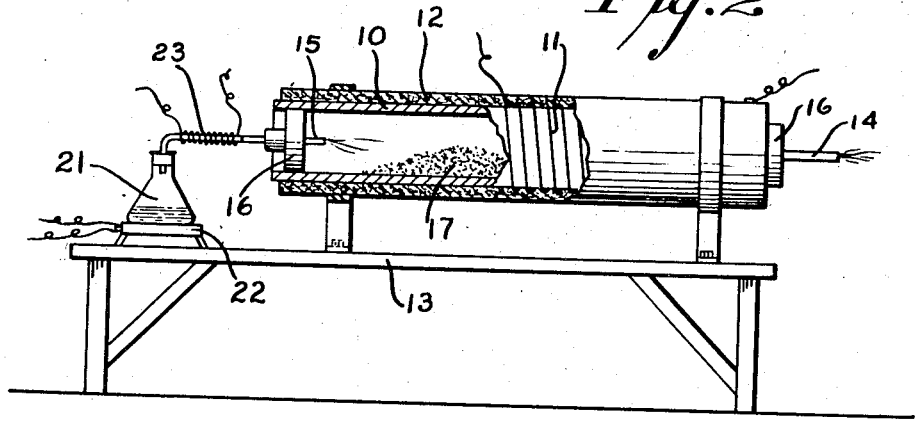

Fig. 1 is a view partly in section of an apparatus for purifying aluminous material with chlorine gas, and Fig. 2 is a view partly in section of an apparatus for purifying aluminous material with chloride vapors.

In the drawing in which corresponding parts are designated by corresponding marks of reference, a tube 10 composed of non-ferrous material which is resistant to chlorine or chloride vapors, such as silica, and provided with a spirally wound electrical heating element 11 and an insulating jacket 12 is mounted on a supporting table 13. One end of the tube 10 is provided with a delivery tube 14 which may be either of silica or of glass. The other end of the tube 10 is provided with a tube 15 of silica or of glass which serves to introduce chlorinating vapors into the tube 10. Each end of the tube 10 is closed by plugs 16 of refractory material to exclude air, the tubes 14 and 15 passing snugly therethrough. The tube 10 contains a quantity of material 17 which is to be treated.

In Fig. 1 a chlorine tank 18 having a pressure-regulating value 19 is connected through a flow meter 20 to the tube 15.

In Fig. 2 a flask 21 containing a volatile chloride to be vaporized is supported upon an electric hot plate 22 and is provided with an electrically heated delivery tube 23 which is connected to the tube 17.

In practicing my invention a quantity of aluminous material to be treated is mixed with 1 to 10 times the amount of carbon theoretically necessary to satisfy Equation (3), depending on the iron content of the material. The mixture is placed in the tube 10 which is connected with a source of chlorine and is sealed against the entrance of air as shown in Fig. 1. The tube and its contents are then heated by means of the heating element 11 to a temperature of 900°–1150° C. and chlorine is introduced through the tube 15, the rate of flow being regulated by the valve 19 and the flow meter 20 to about 2–10 cc. per minute. The ferric chloride which is formed by the reaction is vaporized and issues from the delivery tube 14.

Instead of mixing the carbon with the total quantity of aluminous material to be treated, it may be advantageous to mix the carbon with only a small portion of the material and to place the carbonaceous mixture in the tube 10 adjacent the non-carbonaceous material but in such position that the incoming chlorine will pass first through the carbonaceous mixture. By this means the carbon, being in very large excess in the carbonaceous mixture will be used up in forming therefrom aluminum chloride in accordance with the reaction represented in Equation (4). The aluminum chloride vapor thus formed will permeate the adjacent non-carbonaceous material and will react therewith to form ferric chloride and to revert to aluminum oxide in accordance with Equation (5), the ferric chloride being vaporized and eliminated from the material. This modification of my process has the advantage that the aluminum chloride vapor formed must pass through all of the material with consequent better efficiency.

In the modification of my process which is illustrated in Fig. 2, a quantity of a chloride, such as silicon tetrachloride, aluminum chloride or titanium tetrachloride, is heated in the flask 21 by the hot plate 22 and the vapor is passed through the heated tube 23 and through the material 17 which in this instance contains no carbon.

I claim:

The method of removing iron from high alumina materials, which includes mixing with a small quantity of the material from one to ten times the amount of carbon necessary to satisfy the equation $Fe_2O_3 + 3C + 3Cl_2 = 2FeCl_3 + 3CO$, based on the initial iron content of a total batch of the material to be treated, placing the carbonaceous mixture adjacent the non-carbonaceous batch, heating the whole to a temperature of 900°–1150° C. while excluding air and introducing chlorine gas so as to pass first through the carbonaceous mixture.

MARTIN E. NORDBERG.